(12) United States Patent
Davis

(10) Patent No.: US 8,613,785 B1
(45) Date of Patent: Dec. 24, 2013

(54) TABBED AIR FILTER

(76) Inventor: Dwight L. Davis, New Fairfield, CT (US)

( * ) Notice: Subject to any disclaimer, the term of this patent is extended or adjusted under 35 U.S.C. 154(b) by 378 days.

(21) Appl. No.: 13/030,135

(22) Filed: Feb. 18, 2011

(51) Int. Cl.
*B01D 46/00* (2006.01)

(52) U.S. Cl.
USPC ................ 55/495; 55/357; 55/497; 55/511; 55/DIG. 31

(58) Field of Classification Search
USPC ............... 55/357, 495, 497, DIG. 31, 511
See application file for complete search history.

(56) References Cited

U.S. PATENT DOCUMENTS

| | | | | |
|---|---|---|---|---|
| 3,058,279 A | * | 10/1962 | Metcalfe | ........................ 55/495 |
| 4,394,147 A | | 7/1983 | Caddy et al. | |
| 5,024,760 A | | 6/1991 | Kemper | |
| D392,031 S | | 3/1998 | Miller | |
| 5,795,361 A | * | 8/1998 | Lanier et al. | ..................... 55/502 |
| 5,902,361 A | * | 5/1999 | Pomplun et al. | .............. 55/385.3 |
| 6,126,708 A | * | 10/2000 | Mack et al. | ...................... 55/502 |
| 6,200,465 B1 | | 3/2001 | Carawan et al. | |
| 6,319,300 B1 | * | 11/2001 | Chen | ............................... 55/497 |
| 6,361,577 B1 | * | 3/2002 | Unrath et al. | .................... 55/482 |
| 6,406,509 B1 | * | 6/2002 | Duffy | ............................... 55/492 |
| 6,454,826 B2 | * | 9/2002 | Fath et al. | ........................ 55/490 |
| 6,685,760 B2 | * | 2/2004 | Huehn et al. | ..................... 55/471 |
| 6,926,781 B2 | * | 8/2005 | Duffy | ............................... 156/60 |
| 7,258,717 B2 | * | 8/2007 | Duffy | ............................... 55/497 |
| 7,261,757 B2 | * | 8/2007 | Duffy | ............................... 55/502 |
| 7,320,720 B2 | * | 1/2008 | Ticknor | ........................... 55/483 |
| 7,410,518 B2 | | 8/2008 | Sundet | |
| 7,959,700 B2 | * | 6/2011 | Kidman | ........................... 55/497 |
| 8,021,454 B2 | * | 9/2011 | Braunecker et al. | ............. 55/483 |
| 8,382,874 B2 | * | 2/2013 | Greist et al. | ..................... 55/496 |
| 2006/0150589 A1 | | 7/2006 | Crow | |
| 2012/0151889 A1 | * | 6/2012 | Horey et al. | ..................... 55/467 |

* cited by examiner

*Primary Examiner* — Robert Clemente

(57) ABSTRACT

A tabbed air filter is provided for facilitating removal of the air filter from an air treatment device. The air filter provides a frame, an air filtering material positioned in the frame, and a plurality of graspable tabs extending from the frame.

13 Claims, 4 Drawing Sheets

TABBED AIR FILTER

BACKGROUND OF THE DISCLOSURE

Field of the Disclosure

The disclosure relates to air filter devices and more particularly pertains to a new air filter device for facilitating removal of an air filter by providing a stiff tab extending from the air filter.

SUMMARY OF THE DISCLOSURE

An embodiment of the disclosure meets the needs presented above by generally comprising a frame, an air filtering material positioned in the frame, and a plurality of graspable tabs extending from the frame.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
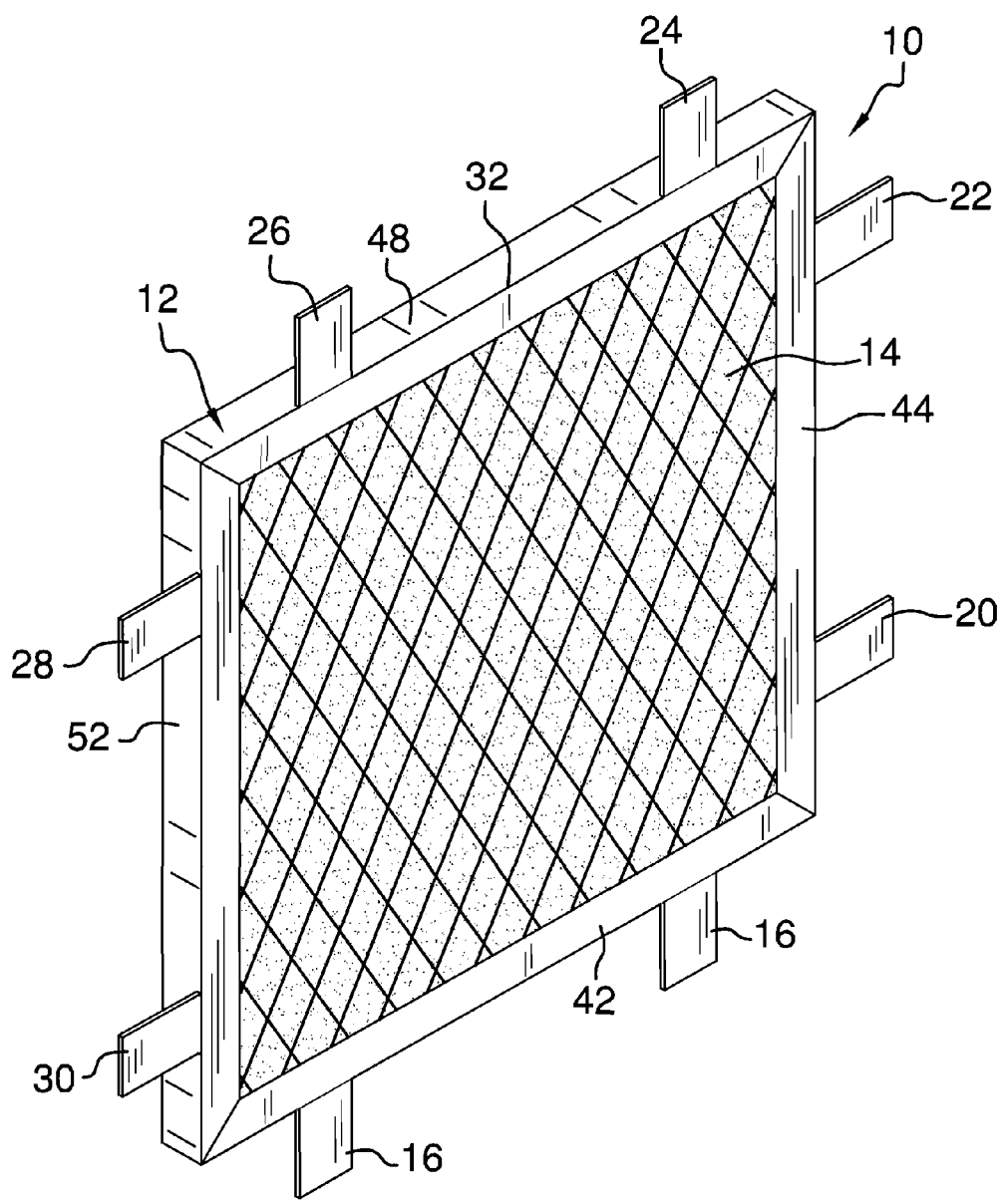
FIG. 1 is a top front side perspective view of a tabbed air filter according to an embodiment of the disclosure.
Figure 2:
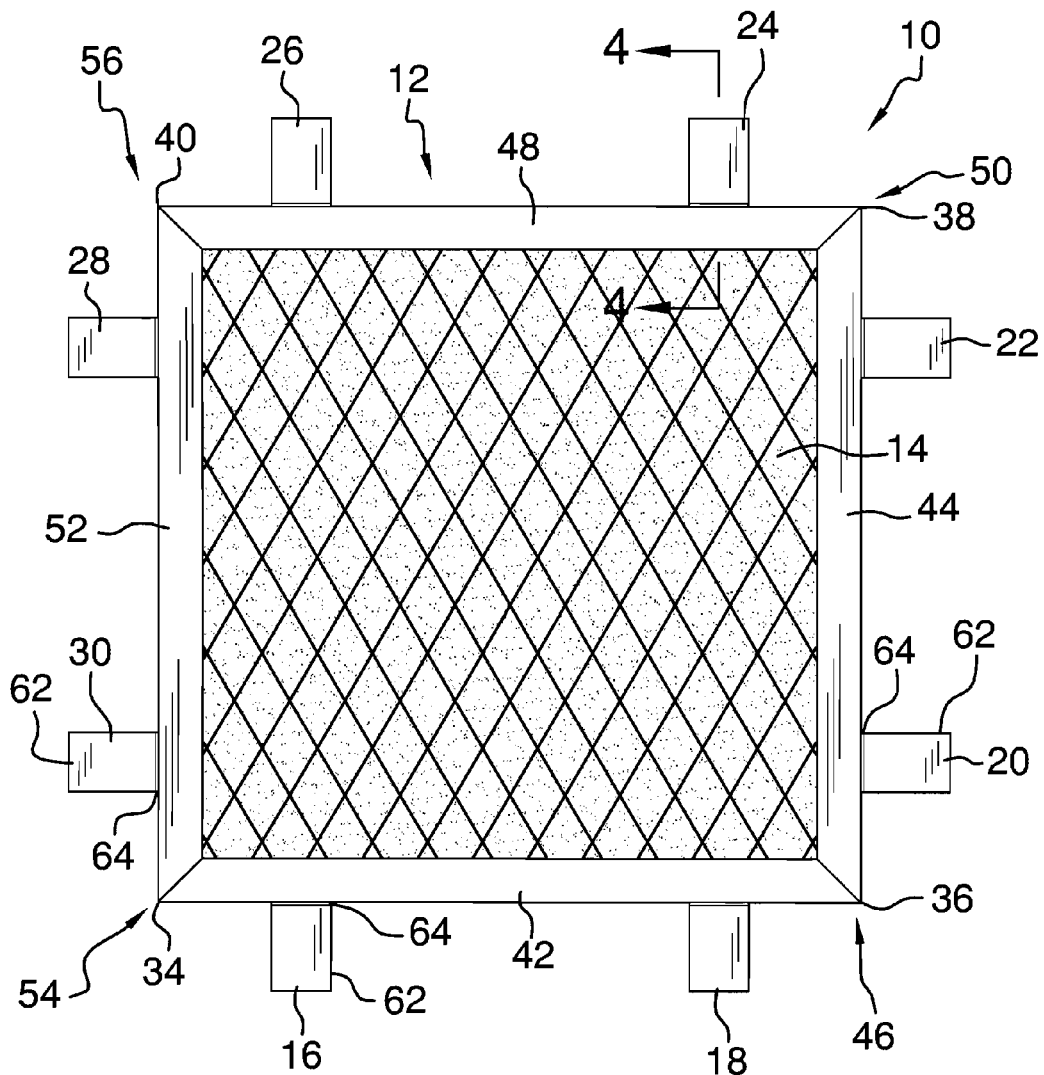
FIG. 2 is a front view of an embodiment of the disclosure.
Figure 3:
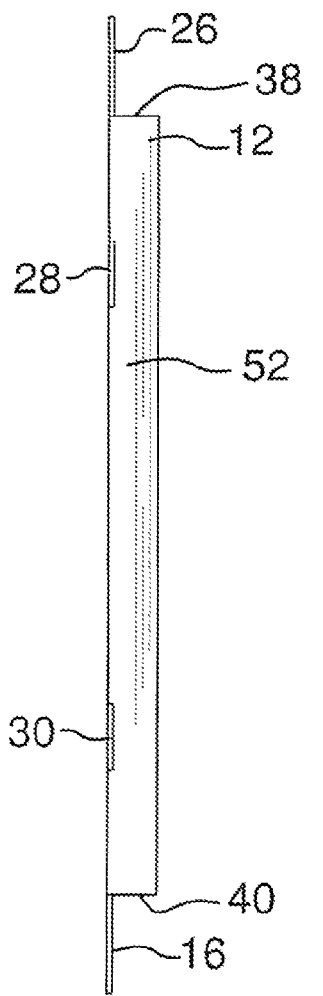
FIG. 3 is a side view of an embodiment of the disclosure.
Figure 4:
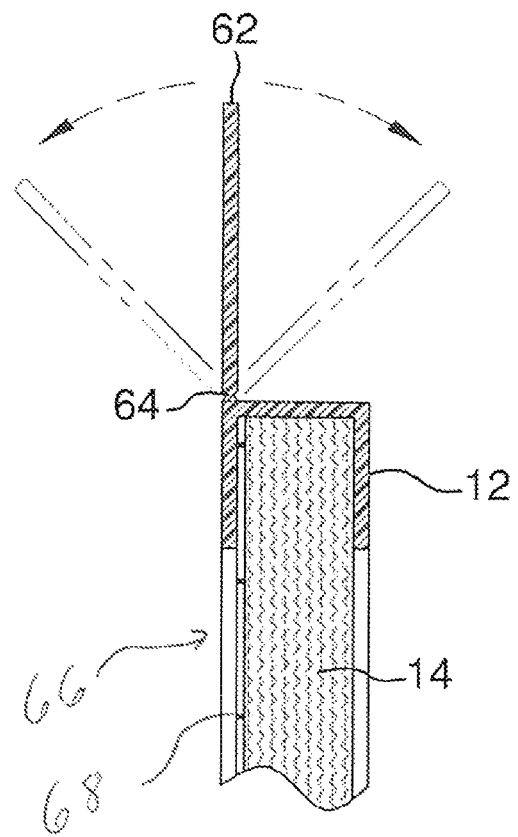
FIG. 4 is a cross-sectional view of an embodiment of the disclosure taken along line 4-4 of FIG. 2.
Figure 5:
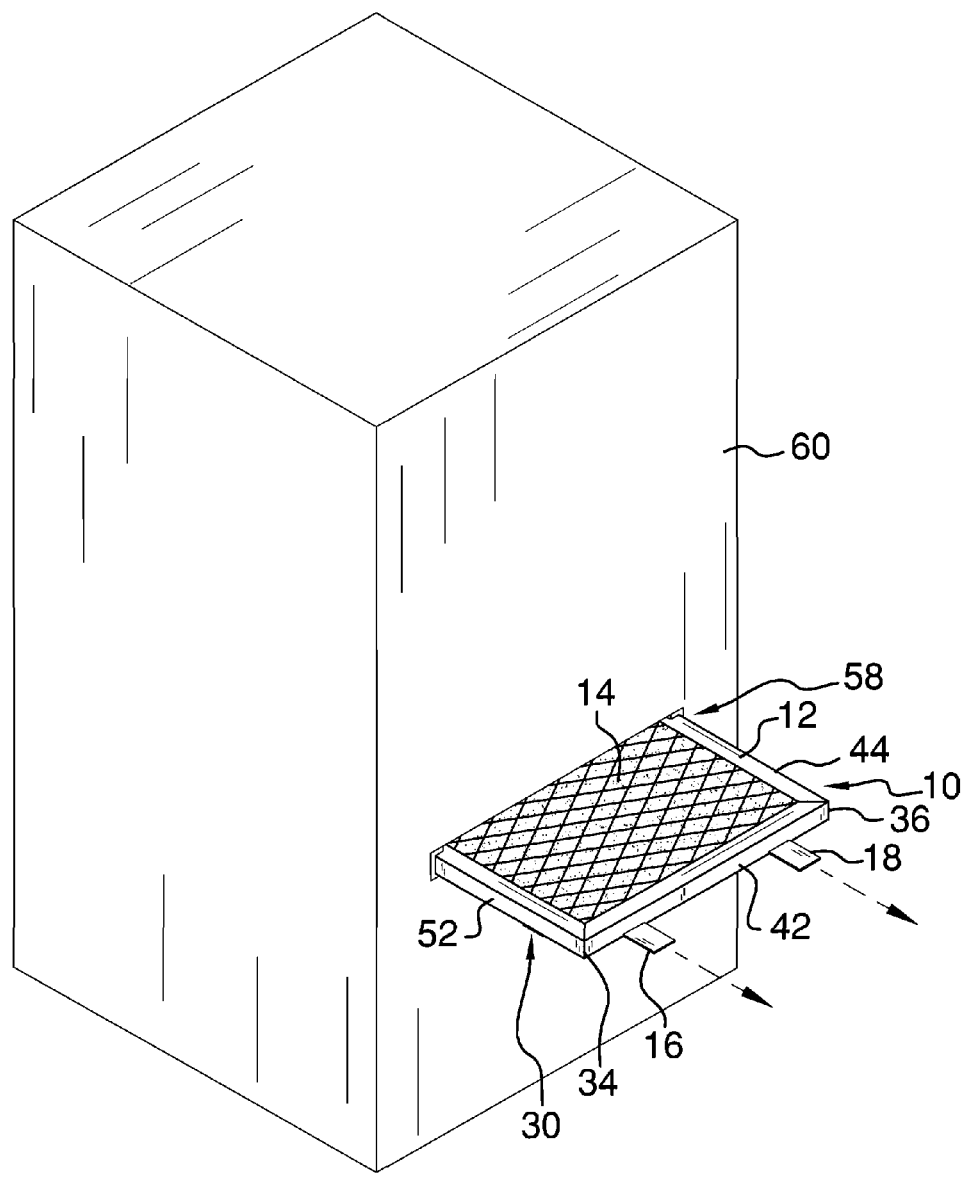
FIG. 5 is a perspective view of an embodiment of the disclosure in use.

With reference now to the drawings, and in particular to FIGS. 1 through 5 thereof, a new air filter device embodying the principles and concepts of an embodiment of the disclosure and generally designated by the reference numeral 10 will be described.

As best illustrated in FIGS. 1 through 5, the tabbed air filter 10 generally comprises a rectangular or square frame 12, an air filtering material 14 positioned in the frame 12, and a plurality of tabs 16,18,20,22,24,26,28,30 extending from the frame 12. The frame 12 may have a relatively large central opening 66 and meshing 68 to support the air filtering material 14 in the frame 12.

Each of the tabs 16,18,20,22,24,26,28,30 extends from a forward edge 32 of the frame 12. Each tab 16,18,20,22,24,26,28,30 is positioned equidistant from a respective adjacently positioned corner 34,36,38,40 of the frame. First tab 16 and eighth tab 30 are spaced from first corner 34. Second tab 18 and third tab 20 are spaced from second corner 36. Fourth tab 22 and fifth tab 24 are spaced from third corner 38. Similarly, sixth tab 26 and seventh tab 28 are spaced from fourth corner 40. Each tab 16,18,20,22,24,26,28,30 is spaced between 4.75 centimeters and 5.25 centimeters from the nearest associated corner 34,36,38,40 of the frame 12.

The first tab 16 and the second tab 18 extend from a first side 42 of the frame 12. The second tab 18 is positioned in spaced relationship to the first tab 16 on a first side 42 of the frame 12. The third tab 20 and the fourth tab 22 both extend from a second side 44 of the frame 12. The second side 44 of the frame 12 is adjacently positioned to the first side 42 of the frame 12 having second corner 36 positioned at a junction 46 between the first side 42 and the second side 44 of the frame 12. The fifth tab 24 and the sixth tab 26 extend from a third side 48 of the frame 12. The third side 48 of the frame 12 is positioned opposite the first side 42 of the frame 12. Third corner 38 is formed at a junction 50 between third side 48 and second side 44 of the frame 12. The seventh tab 28 and the eighth tab 30 extend from a fourth side 52 of the frame 12. The fourth side 52 of the frame 12 extends between the first side 42 and the third side 48 of the frame 12 and is positioned opposite the second side 44 of the frame 12. The first corner 34 is formed by a junction 54 of the first side 42 and the fourth side 52. The fourth corner 40 is formed by a junction 56 of the fourth side 52 and the third side 48 of the frame 12. The frame 12 is configured to fit snugly within an air filter slot 58 of an air treatment device 60 such as an air conditioner, heater, heat pump, air filtering unit or the like. The frame 12 may be configured to fit various sizes of air filter slots associated with the various types and sizes of air treatment devices conventionally known.

A distal portion 62 of each tab 16,18,20,22,24,26,28,30 relative to the frame 12 is stiff to facilitate grasping by a user. A thinned connection portion 64 of each tab 16,18,20,22,24, 26,28,30 extends between the distal portion 62 and the frame 12. The thinned connection portion 64 has a lesser thickness extending across each tab 16,18,20,22,24,26,28,30 compared to the stiff distal portion 62. Thus, the distal portion 62 of each tab 16,18,20,22,24,26,28,30 is pivotable relative to the frame 12. The connection portion 64 may be a living hinge constructed of plastic or a functional equivalent constructed of another material such as cardboard.

Each tab 16,18,20,22,24,26,28,30 is generally rectangular having a width between 4.75 centimeters and 5.25 centimeters and a length extending out from the frame 12 between 7.5 and 8.0 centimeters.

In use, the air filter 10 is positioned in the air filter slot 58 of the air treatment device 60. The positioning of the tabs 16,18,20,22,24,26,28,30 along the forward edge 32 allows them to be folded back against the frame 12 or selectively removed to prevent interference with insertion of the frame 12 into the slot 58. The tabs 16,18,20,22,24,26,28,30 not folded or removed extend from the slot 58 and may be easily grasped to facilitate removal of the filter 10 when desired.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. An air filter assembly comprising:
   a frame;
   an air filtering material positioned in said frame; and
   a plurality of tabs extending from said frame, said frame having a first side, a second side and a perimeter edge extending between said first and second sides, each of said tabs lying in a same plane as said second side such that said tabs each extend outwardly from an exterior of said perimeter edge, a distal portion of each said tab relative to said frame being stiff, a thinned connection portion of each said tab extending between said distal portion and said frame whereby said distal portion of each said tab is pivotable relative to said frame.

2. The assembly of claim 1, further including a first tab and a second tab of said plurality of tabs extending from said frame, said second tab being positioned in spaced relationship to said first tab on a first edge of said perimeter edge of said frame.

3. The assembly of claim 2, further including a third tab and a fourth tab of said plurality of tabs extending from said frame, said third tab and said fourth tab being positioned on a second edge of said perimeter edge of said frame, said second edge of said frame being adjacently positioned to said first edge of said frame.

4. The assembly of claim 3, further including a distal portion of each said tab relative to said frame being stiff.

5. The assembly of claim 4, further including a thinned connection portion of each said tab extending between said distal portion and said frame whereby said distal portion of each said tab is pivotable relative to said frame.

6. The assembly of claim 3, further including a fifth tab and a sixth tab of said plurality of tabs extending from said frame, said fifth tab and said sixth tab being positioned on a third edge of said perimeter edge of said frame, said third edge of said frame being positioned opposite said first edge of said frame.

7. The assembly of claim 6, further including a distal portion of each said tab relative to said frame being stiff.

8. The assembly of claim 7, further including a thinned connection portion of each said tab extending between said distal portion and said frame whereby said distal portion of each said tab is pivotable relative to said frame.

9. The assembly of claim 6, further including a seventh tab and an eighth tab of said plurality of tabs extending from said frame, said seventh tab and said eighth tab being positioned on a fourth edge of said perimeter edge of said frame, said fourth edge of said frame being positioned opposite said second edge of said frame.

10. The assembly of claim 9, further including a distal portion of each said tab relative to said frame being stiff.

11. The assembly of claim 10, further including a thinned connection portion of each said tab extending between said distal portion and said frame whereby said distal portion of each said tab is pivotable relative to said frame.

12. The assembly of claim 2, wherein each said tab is positioned equidistant from an adjacently positioned corner of said frame.

13. An air filter assembly comprising:
    a frame;
    an air filtering material positioned in said frame;
    a plurality of tabs extending from said frame, each of said tabs extending from a forward edge of said frame, wherein each said tab is positioned equidistant from an adjacently positioned corner of said frame, said frame having a first side, a second side and a perimeter edge extending between said first and second sides, each of said tabs lying in a same plane as said second side such that said tabs each extend outwardly from an exterior of said perimeter edge;
    a first tab and a second tab of said plurality of tabs extending from said frame, said second tab being positioned in spaced relationship to said first tab on a first edge of a perimeter edge of said frame;
    a third tab and a fourth tab of said plurality of tabs extending from said frame, said third tab and said fourth tab being positioned on a second edge of said perimeter edge of said frame, said second edge of said frame being adjacently positioned to said first edge of said frame;
    a fifth tab and a sixth tab of said plurality of tabs extending from said frame, said fifth tab and said sixth tab being positioned on a third edge of said perimeter edge of said frame, said third edge of said frame being positioned opposite said first edge of said frame;
    a seventh tab and an eighth tab of said plurality of tabs extending from said frame, said seventh tab and said eighth tab being positioned on a fourth edge of said perimeter edge of said frame, said fourth edge of said frame being positioned opposite said second edge of said frame;
    a distal portion of each said tab relative to said frame being stiff; and
    a thinned connection portion of each said tab extending between said distal portion and said frame whereby said distal portion of each said tab is pivotable relative to said frame.

* * * * *